US012698663B2

(12) United States Patent
Rose et al.

(10) Patent No.: US 12,698,663 B2
(45) Date of Patent: Aug. 4, 2026

(54) SLIDING DOOR SYSTEM AND ROLLER GUIDE FOR THE SAME

(71) Applicant: ALLEGION ACCESS TECHNOLOGIES LLC, Farmington, CT (US)

(72) Inventors: Aaron Rose, Hamden, CT (US); Christopher E. Kolodziej, Kensington, CT (US); Paul N. Gorgas, Monroe, CT (US); Vinay Patel, Rocky Hill, CT (US); Todd Strickler, Elizabethtown, PA (US); Thuan Van Nguyen, South Windsor, CT (US); Gary Barch, Farmington, CT (US)

(73) Assignee: Allegion Access Technologies LLC, Farmington, CT (US)

( * ) Notice: Subject to any disclaimer, the term of this patent is extended or adjusted under 35 U.S.C. 154(b) by 23 days.

(21) Appl. No.: 18/791,889

(22) Filed: Aug. 1, 2024

(65) Prior Publication Data

US 2025/0059811 A1 Feb. 20, 2025

Related U.S. Application Data

(60) Provisional application No. 63/520,122, filed on Aug. 17, 2023.

(51) Int. Cl.
*E05D 15/06* (2006.01)
*E05B 65/08* (2006.01)
(Continued)

(52) U.S. Cl.
CPC .......... *E05D 15/0669* (2013.01); *E05B 65/08* (2013.01); *E05D 15/08* (2013.01);
(Continued)

(58) Field of Classification Search
CPC ... E05D 15/48; E05D 15/08; E05D 2015/485; E05B 65/08
See application file for complete search history.

(56) References Cited

U.S. PATENT DOCUMENTS

| | | | |
|---|---|---|---|
| 484,235 | A | 10/1892 | Plunkett |
| 1,569,602 | A | 1/1926 | Anderson |

(Continued)

FOREIGN PATENT DOCUMENTS

| | | | |
|---|---|---|---|
| CN | 213928055 | U | 8/2021 |
| EP | 2565356 | A1 | 3/2013 |
| WO | 2015018608 | A1 | 2/2015 |

OTHER PUBLICATIONS

International Search Report; ISA/US; International Application No. PCT/US2024/042906; Jul. 18, 2025; 4 pages.

(Continued)

*Primary Examiner* — Justin B Rephann
(74) *Attorney, Agent, or Firm* — Taft Stettinius & Hollister LLP

(57) ABSTRACT

A sliding door system that includes at least one sliding door operable for movement between a closed position to at least partially cover a doorway opening and an opened position to at least partially expose the doorway opening. The sliding door has adjustable roller guides at each side of the sliding door that movably support the sliding door on a guide track along the floor.

19 Claims, 7 Drawing Sheets

(51) Int. Cl.
*E05D 15/08* (2006.01)
*E05D 15/48* (2006.01)

(52) U.S. Cl.
CPC ........ *E05D 15/48* (2013.01); *E05D 2015/485* (2013.01); *E05Y 2900/132* (2013.01)

(56) References Cited

U.S. PATENT DOCUMENTS

| | | | | |
|---|---|---|---|---|
| 1,633,375 | A | 6/1927 | Dudley | |
| 1,934,299 | A | 11/1933 | Fairhurst | |
| 2,638,190 | A | 5/1953 | Watkins | |
| 3,397,487 | A | 8/1968 | Hunt et al. | |
| 3,750,337 | A * | 8/1973 | Brydolf | E06B 3/4663 49/411 |
| 4,123,874 | A * | 11/1978 | Scott | E06B 3/4663 49/411 |
| 4,164,095 | A | 8/1979 | Musacchia | |
| 4,288,887 | A * | 9/1981 | Johnson | E05D 15/063 403/231 |
| 4,722,150 | A * | 2/1988 | Jacobs | E05D 15/0665 16/98 |
| 4,850,145 | A * | 7/1989 | McAfee | E05D 15/0691 49/404 |
| 5,671,502 | A * | 9/1997 | Ezman | E05D 15/0673 16/105 |
| 5,724,770 | A * | 3/1998 | McAfee | E05D 15/066 49/404 |
| 5,742,979 | A * | 4/1998 | Garcia-Hernando | E05D 15/0673 49/404 |
| 5,908,064 | A | 6/1999 | Bruce | |
| 5,927,017 | A * | 7/1999 | Jacobs | E05D 15/0673 49/425 |
| 5,964,061 | A * | 10/1999 | Hughes | E05D 15/0669 49/410 |
| 6,612,358 | B2 | 9/2003 | Hay et al. | |
| 6,973,753 | B2 | 12/2005 | Liebscher | |
| 7,992,355 | B2 | 8/2011 | Bridgman et al. | |
| 8,006,436 | B2 * | 8/2011 | McDaniel | E06B 3/4609 49/366 |
| 8,205,387 | B2 | 6/2012 | Ranaudo et al. | |
| 8,443,549 | B2 | 5/2013 | Salvietti | |
| 8,496,038 | B2 * | 7/2013 | Kondash | E06B 3/481 16/91 |
| 8,627,604 | B2 | 1/2014 | Seymour et al. | |
| 8,826,598 | B2 | 9/2014 | Ranaudo et al. | |
| 9,074,420 | B2 * | 7/2015 | Goodman | E05D 15/26 |
| 9,187,941 | B2 * | 11/2015 | Therrien | E05D 15/0621 |
| 9,458,654 | B2 | 10/2016 | Palsson et al. | |
| 9,637,970 | B1 | 5/2017 | Rendon, Jr. et al. | |
| 9,903,148 | B2 | 2/2018 | Rodems et al. | |
| 10,113,347 | B2 | 10/2018 | Wolfe | |
| RE47,380 | E | 5/2019 | Bridgman et al. | |
| 10,280,678 | B1 | 5/2019 | Rendon, Jr. et al. | |
| 10,513,876 | B2 | 12/2019 | Molloy et al. | |
| 10,577,848 | B2 | 3/2020 | Rodems et al. | |
| 10,718,150 | B2 | 7/2020 | Hall et al. | |
| 10,808,446 | B2 | 10/2020 | Hall et al. | |
| 10,851,572 | B1 * | 12/2020 | Flynn | E06B 3/4636 |
| 10,890,016 | B2 | 1/2021 | Brewer | |
| 10,920,477 | B2 | 2/2021 | Akgor et al. | |
| 10,995,537 | B2 | 5/2021 | Hall et al. | |
| 10,995,538 | B2 | 5/2021 | Hall et al. | |
| 11,168,508 | B2 | 11/2021 | Dreyer | |
| 11,274,490 | B2 | 3/2022 | Goldfinch et al. | |
| 11,401,735 | B2 | 8/2022 | Schonberger | |
| 11,448,003 | B2 | 9/2022 | Wolfe et al. | |
| 11,492,832 | B2 | 11/2022 | Hernandez | |
| 11,555,344 | B2 | 1/2023 | Patel et al. | |
| 11,713,616 | B2 * | 8/2023 | Wolfe | E06B 3/481 49/31 |
| 2005/0000164 | A1 * | 1/2005 | Jacobs | E05D 15/0691 49/425 |
| 2005/0235571 | A1 * | 10/2005 | Ewing | E05D 15/0634 49/410 |
| 2007/0017157 | A1 * | 1/2007 | Ambrozus | E05D 15/0669 49/404 |
| 2007/0062122 | A1 * | 3/2007 | Polus | E05D 15/0686 49/425 |
| 2008/0092445 | A1 | 4/2008 | Ramirez | |
| 2012/0117881 | A1 | 5/2012 | Seymour et al. | |
| 2012/0247024 | A1 | 10/2012 | Therrien | |
| 2013/0042534 | A1 | 2/2013 | Polus | |
| 2013/0097935 | A1 | 4/2013 | Sprague | |
| 2019/0309561 | A1 | 10/2019 | Hall et al. | |
| 2021/0032905 | A1 | 2/2021 | Zhang et al. | |
| 2022/0098926 | A1 | 3/2022 | Comaglio | |
| 2022/0136303 | A1 | 5/2022 | Martin et al. | |
| 2022/0235593 | A1 | 7/2022 | Bai | |
| 2023/0061488 | A1 | 3/2023 | Wolfe et al. | |
| 2023/0067739 | A1 | 3/2023 | Patel et al. | |
| 2023/0086262 | A1 | 3/2023 | Erskine et al. | |
| 2023/0088843 | A1 | 3/2023 | Oakes et al. | |
| 2023/0110893 | A1 | 4/2023 | Stabile | |

OTHER PUBLICATIONS

Written Opinion of the International Searching Authority; ISA/US; International Application No. PCT/US2024/042906; Jul. 18, 2025; 10 pages.

* cited by examiner

SLIDING DOOR SYSTEM AND ROLLER GUIDE FOR THE SAME

CROSS-REFERENCE TO RELATED APPLICATION

The present application claims the benefit of the filing date of U.S. Provisional Application Ser. No. 63/520,122 filed on Aug. 17, 2023, which is incorporated herein by reference in its entirety.

TECHNICAL FIELD

The present disclosure relates to a sliding door system, and more particularly to an adjustable roller guide for a sliding door of the sliding door system.

BACKGROUND

Door systems include one or more movable door members in order to facilitate ingress and egress. Some systems include door members that are swing doors that move about a pivot axis. Some door systems include sliding door members or revolving door members.

Sliding door systems have one or more sliding doors that move along at least one guide track between an open position and a closed position. Some sliding door systems have all or a portion of the weight of the sliding door supported on the guide track on the floor at the bottom of the door. Other sliding door systems have one or more sliding doors that hang from an upper track, and have all or a portion of the weight of the sliding door supported by the upper track, while the bottom of the sliding door is guided along the guide track.

Unevenness of the floor along the threshold can be an issue for operability of sliding door systems, particularly for sliding doors whose weight is supported at least in part on the guide track along the bottom of the door. In addition, floor unevenness can create misalignment issues for a sliding door that has multiple panels, such as an upper panel that can be decoupled from a lower panel to provide window functionality. When the panels are decoupled from one another, the upper panel is movably supported solely by the upper track, and the lower panel is movably supported solely by the guide track on the bottom of the door. An uneven floor can create a non-parallel alignment between the upper and lower panels when they are decoupled from one another. In addition, the lower panel can rock as it moved along the guide track. Therefore, further improvements in sliding door systems are needed.

SUMMARY

In accordance with one or more embodiments of the present disclosure, a sliding door system is provided with at least one sliding door. The sliding door has an adjustable roller guide at each of the left and right sides of the sliding door. The adjustable roller guides support the sliding door on a guide track located across the door threshold. Each roller guide is independently adjustable to compensate for unevenness of the floor on which the guide track is positioned.

In an embodiment, the sliding door includes an upper panel movably supported in a guide rail along an upper side of the door, and a lower panel movably supported in a guide track along a bottom of the sliding door. The upper and lower panels are releasably attached to one another so that the upper panel can function as a window independently of the lower panel, and the upper and lower panels can be coupled to one another to function as a sliding door. The roller guides in the lower panel allow each side of the lower panel to be adjusted relative to the floor and to the upper panel so that the lower panel can be positioned in parallel with the upper panel.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The various advantages of the exemplary embodiments will become apparent to one skilled in the art by reading the following specification and appended claims, and by referencing the following drawings, in which:

DETAILED DESCRIPTION

Figure 1:
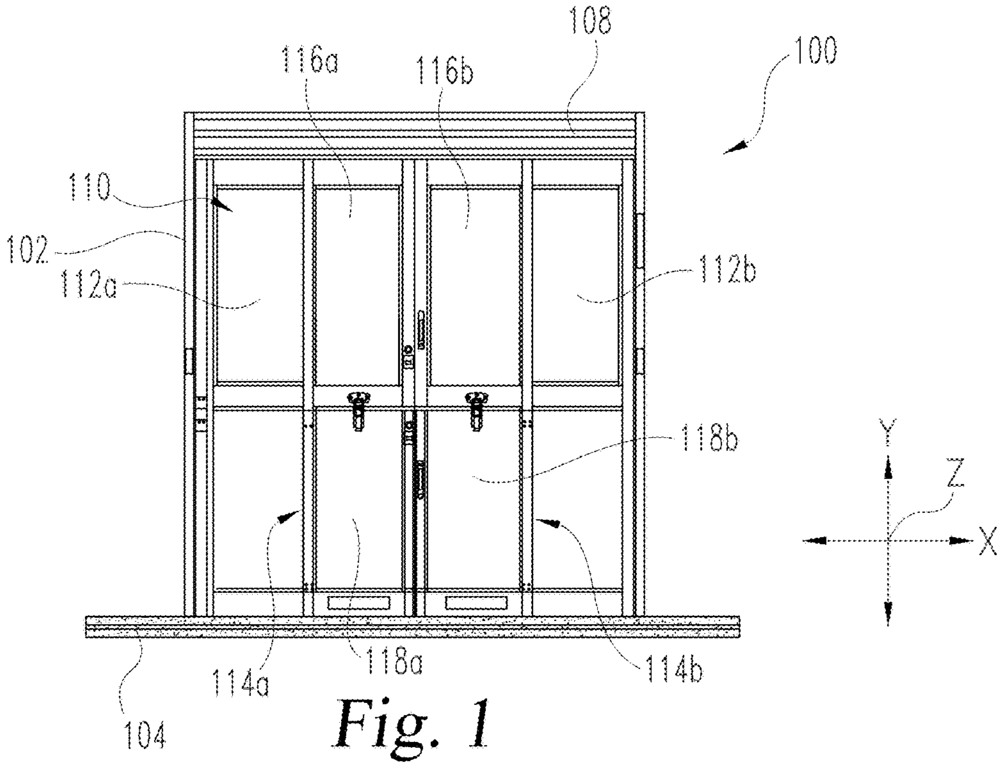
FIG. 1 is an elevation view from an interior side of a sliding door system with sliding doors in a closed condition, in accordance with one or more embodiments of the present disclosure.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. The directions defined by each axis may be referred to as positive and negative directions, wherein the arrow of the axis indicates the positive direction. In the coordinate system illustrated in FIG. 1 the X-axis defines first and second lateral directions (horizontal in the FIG. 1 orientation), the Y-axis defines first and second longitudinal directions (vertical in the FIG. 1 orientation), and the Z-axis defines first and second transverse directions (into and out of the page in the FIG. 1 orientation.)

Additionally, the descriptions that follow may refer to the directions defined by the axes with specific reference to the orientations illustrated in the Figures. For example, the longitudinal directions may be referred to as "distal" ($X^+$) and "proximal" ($X^-$). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Turning to the figures, in which FIG. 1 illustrates a sliding door system 100, in accordance with one or more embodiments. In the illustrated embodiment, the sliding door system 100 has a structural configuration that combines the functionality of a window with a sliding door, such as disclosed in US Patent Application Pub. No. 2023/0067739, which is incorporated herein by reference. However, embodiments in which sliding door system 100 lacks window functionality are also contemplated and not precluded by the present disclosure.

In accordance with one or more embodiments, the sliding door system 100 is configured for mounting at a frame 102 in an opening to a building or other enclosure. In accordance with one or more embodiments, an example sliding door system 100 includes a door panel assembly 110 operable for lateral movement along the X-axis with respect to frame 102 via a guide track 106 mounted to floor 104 and via a header 108 mounted to the building structure. Header 108 may include a rail, pulley, track, or other structure from which all or a portion of the weight of door panel assembly 110 is supported. In addition, all or a portion of the weight of door panel assembly may be supported in guide track 106. The sliding door system 100 may have a power source and sensors for automatic movement, and/or may be manually moved for opening and closing.

Figure 2:
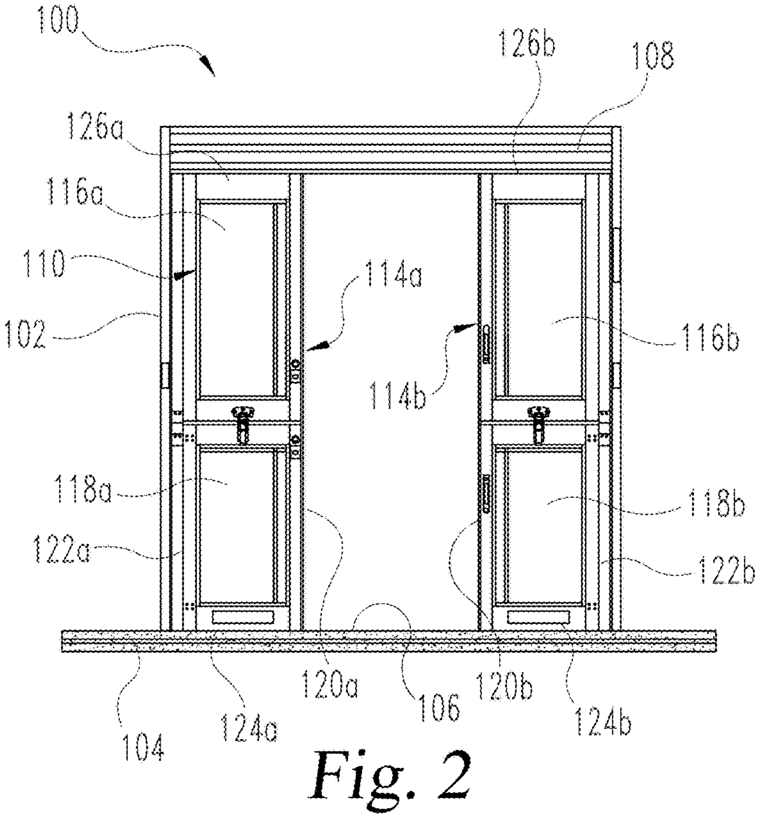
FIG. 2 is an elevation view of the sliding door system of FIG. 1 with sliding doors in an open condition.
Figure 3:
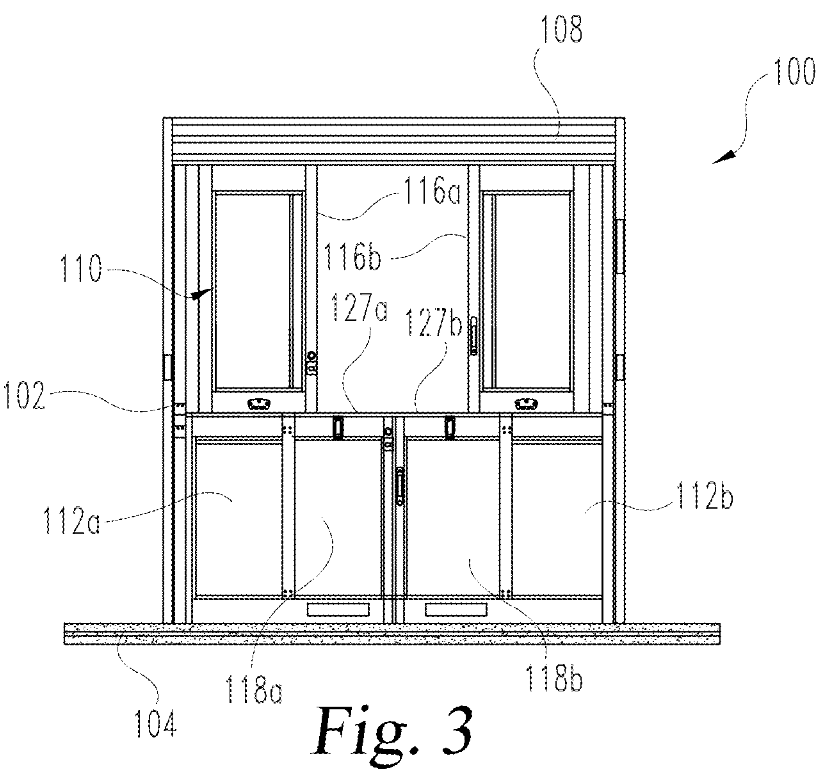
FIG. 3 is an elevation view of the sliding door system of FIG. 1 with upper window panels of the sliding doors in an open condition and lower door panels of the sliding doors in a closed condition during operation of the sliding door system in a window mode.

As illustrated in FIGS. 1-3, the door panel assembly 110 is configured for mounting at the frame 102, which defines a doorway opening. In the illustrated embodiment, the door panel assembly 110 has a vertically or longitudinally bifurcated structural configuration (along the Y-axis) that includes at two stationary panels or sidelights 112*a*, 112*b* and two sliding doors 114*a*, 114*b*. Sliding doors 114*a*, 114*b* are operable for movement in a lateral direction (along the X-axis) between a closed position to at least partially cover the doorway opening and an open position to at least partially expose the doorway opening. In the illustrated embodiments, two sliding doors 114*a*, 114*b* are shown, but embodiments with only one sliding door panel and/or only one stationary panel 112*a*, 112*b*, or no stationary panels, are also contemplated.

In the illustrated embodiment, each sliding door 114*a*, 114*b* has a lateral or horizontally bifurcated structural configuration (along the X-axis) that includes an upper window panel 116*a*, 116*b* and a lower door panel 118*a*, 118*b* that are split horizontally for independent movement relative to one another. However, as discussed above, embodiments in which the door panel assembly 110 does not include a bifurcated configuration are also contemplated.

The upper window panel 116*a*, 116*b* is releasably attached to the lower door panel 118*a*, 118*b* in a manner that facilitates selective placement of the sliding door 114*a*, 114*b* between a window operating mode and a door operating mode to permit ingress and egress of a user through the doorway opening. In the door operating mode, the window panel 116*a*, 116*b* and the lower door panel 118*a*, 118*b* are attached to each other, the attachment being released to place the upper window panel 116*a*, 116*b* in the window operating mode.

In the illustrated embodiment, each sliding door 114*a*, 114*b* includes a first lateral side 120*a*, 120*b* and an opposite second lateral side 122*a*, 122*b*, respectively, as shown in FIG. 2. Lateral sides 120*a*, 122*a* of sliding door 114*a* extend in a longitudinal direction along the Y-axis between a first longitudinal side 124*a* and a second longitudinal side 126*a*. Lateral sides 120*b*, 122*b* of sliding door 114*b* extend in a longitudinal direction along the Y-axis between a first longitudinal side 124*b* and a second longitudinal side 126*b*. Longitudinal sides 124*a*, 126*a* and longitudinal sides 124*b*, 126*b* extend in lateral direction along the X-axis. In addition, for bifurcated door panels 114*a*, 114*b*, the lower door panels 118*a*, 118*b* include longitudinal sides 127*a*, 127*b* along which the lower sides of window panels 116*a*, 116*b* move.

Figure 4:
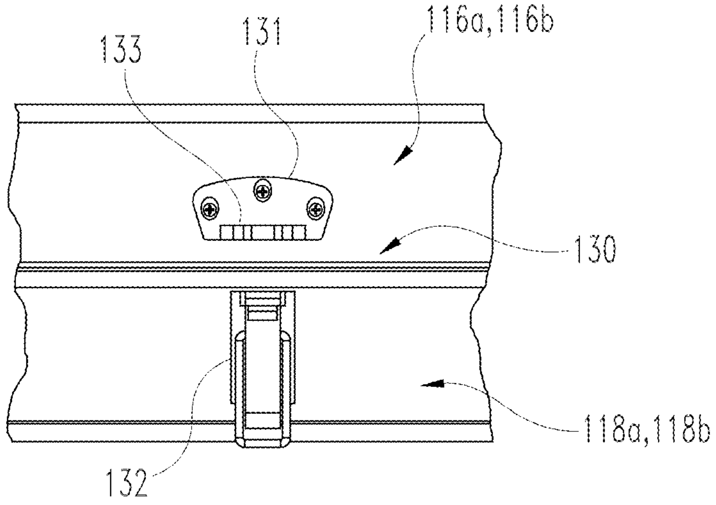
FIG. 4 is a plan view of coupling mechanism in an unsecure position to decouple the lower door panels from the upper window panels for operation of the sliding door system in the window mode.
Figure 5:
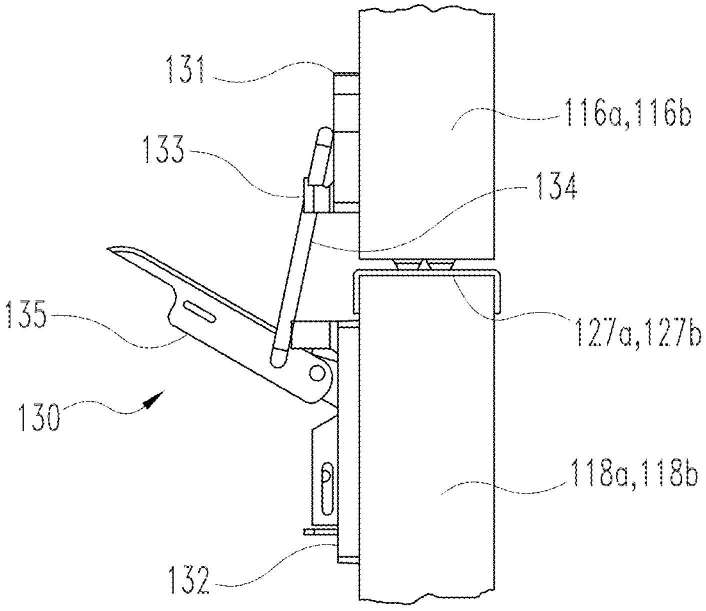
FIG. 5 is an elevation view of the coupling mechanism of FIG. 4 being positioned to couple the lower door panel to the upper window panel for operation in the door mode.

As illustrated in FIGS. 4 and 5, the window panel 116*a*, 116*b* and associated lower door panel 118*a*, 118*b* can be releasably coupled to one another with one or more clamp assemblies 130 that are operable to releasably interlock the upper window panel 116*a*, 116*b* and corresponding the lower door panel 118*a*, 118*b*. One or more clamp assemblies 130 can be used to facilitate the selective placement of the sliding door 114*a*, 114*b* between the window operating mode and the door operating mode. Other embodiments contemplate other structures for securing the window and door panels to one another. Of course, in embodiments in which there is no bifurcated sliding door 114*a*, 114*b*, clamp assembly 130 can be omitted.

In accordance with the illustrated embodiment, the clamp assembly 130 includes an upper clamp body 131 and a lower clamp body 132 that provide a visual aid to the user to visually determine when the clamp assembly 130 is engaged or disengaged. The upper clamp body 131 is arranged as a receiver on the upper window panel 116*a*, 116*b*, whereas the lower clamp body 132 is arranged on the lower door panel 118*a*, 118*b*.

The upper clamp body 131 has one or more protrusions 133 that include grooves or other structure to receive a clamp member 134. The lower clamp body 132 has a pivotally-attached clamp member 134, such as a hook, that is pivotably moveable via a handle 135 between a clamped position to place the clamp assembly 130 in a locked operating state, and an unclamped position to place the clamp assembly 130 in an unlocked state. In the clamped position, a user may pivot the clamp member 134 for engagement with the upper clamp member 131 and engagement with protrusion 133. In the unclamped position, the clamp member 134 is counter-pivoted for disengagement with the upper clamp member 131 and movement out disengagement with protrusion 133.

The structural configuration of the clamp assembly 130 facilitates self-centering of the upper sliding window panel 116*a*, 116*b* and the lower sliding door panel 118*a*, 118*b*. Such self-centering serves to align the upper sliding window panel member 11*a*, 116*b* and corresponding lower sliding door panel 118*a*, 118*b* when placed from the window operating mode to the door operating mode.

In the door operating mode, a user may place the clamp assembly 130 in the clamped or locked operating state by selectively manipulating the handle 135 to facilitate engagement of the clamp member 134 to the one or more protrusions 133. Such engagement interlocks the upper sliding window panel 116*a*, 116*b* and the corresponding lower sliding door panel 118*a*, 118*b*. In that way, the upper sliding window panel 116*a*, 116*b* and corresponding lower sliding door panel 118*a*, 118*b* may move jointly.

In the window operating mode, a user may place the clamp assembly 130 in the unclamped or unlocked operating state by selectively manipulating the handle 135 to facilitate disengagement of the clamp member 134 and the one or more protrusions 133. Such disengagement releases the attachment of the upper sliding window panel 116*a*, 116*b* and the corresponding lower sliding door panel 118*a*, 118*b*. As a result, in the window operating mode, the entire weight of the sliding door panels 118*a*, 118*b* is supported on guide track 106.

Figure 6:
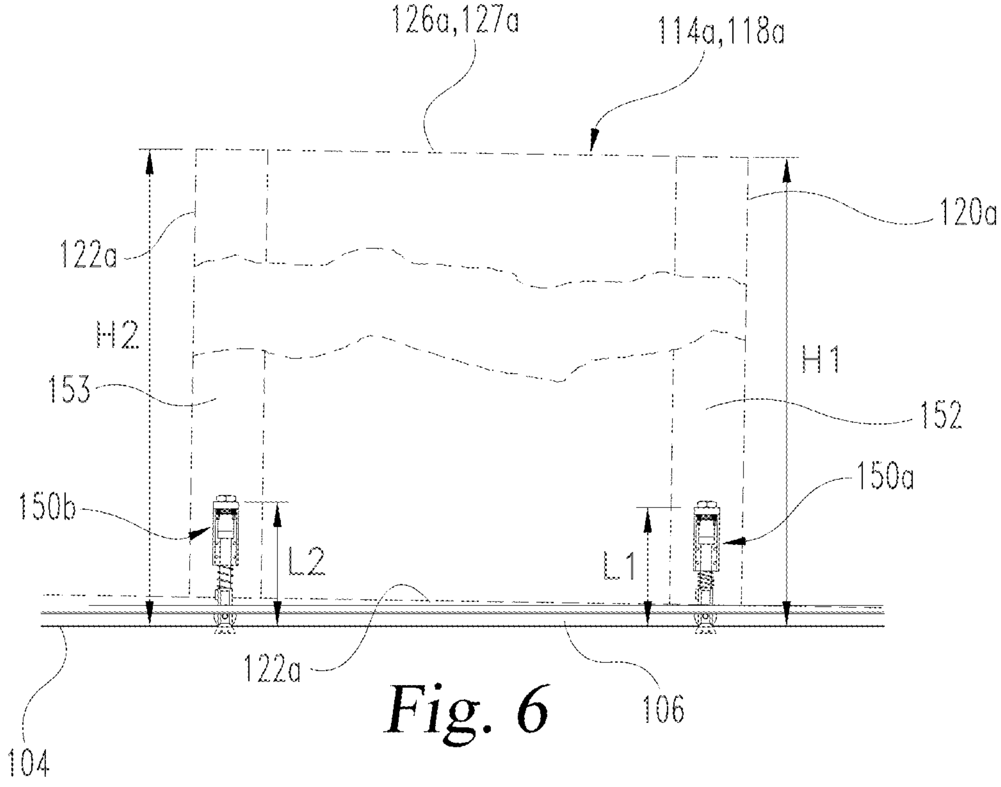
FIG. 6 is a schematic view of a lower portion of a sliding door for a sliding door system, such as shown in FIG. 1, and adjustable roller guides at the leading and trailing stiles of the sliding door or lower door panel.
Figure 7:
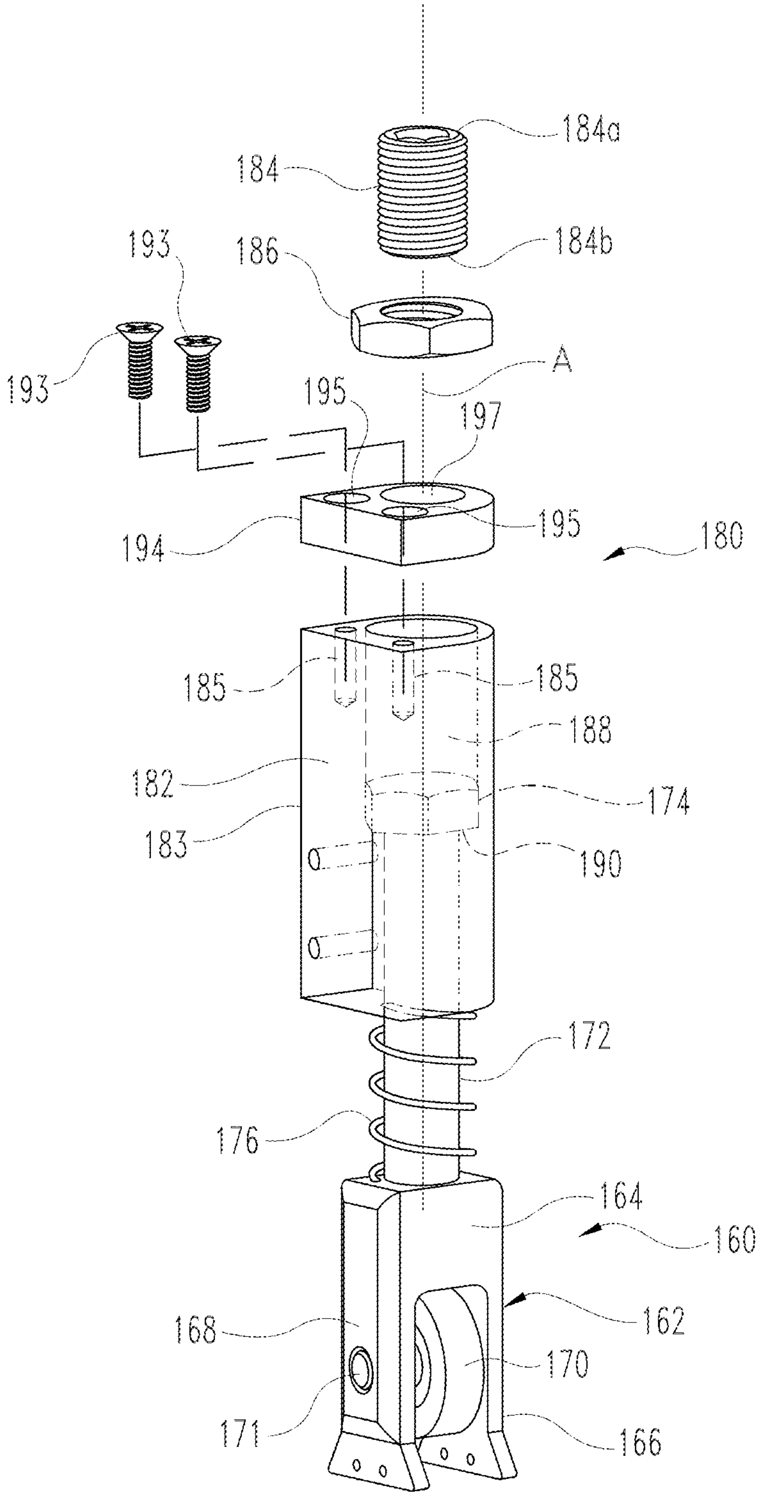
FIG. 7 is an exploded perspective view of an embodiment of the roller guide of FIG. 6 for a sliding door or lower door panel for a sliding door system, such as shown in FIG. 1.

In accordance with one or more embodiments, each sliding door 114*a*, 114*b* includes a plurality of roller guides 150*a*, 150*b* (collectively and individually also referred to herein as roller guide 150) that engage each door panels 114*a*, 114*b* to guide track 106 along floor 104. For example, FIG. 6 shows roller guides 150*a*, 150*b* engaged to door panel 114*a* adjacent first lateral side 120*a* and second lateral side 120*b*, respectively, at the first longitudinal side 124*a* of door panel 114*a*. It should be understood that the second door panel 114*b*, if provided in the sliding door system, could be similarly configured with a pair of roller guides 150*a*, 150*b*.

In an embodiment, first roller guide 150*a* is housed in a leading stile 152 of sliding door 114*a* at first lateral side 120*a*, and second roller guide 150*b* is housed in a trailing stile 153 of sliding door 114*a* at second lateral side 122*a*. As discussed further below, each roller guide 150*a*, 150*b* is independently adjustable in length, as indicated by L1 and L2, in order to adjust a height H1 and/or a height H2 of the second longitudinal side 126*a* of sliding door 114*a* and/or the height of the longitudinal side 127*a* of door panel 118*a* above floor 104. This allows for the longitudinal sides 126*a*, 127*a* to be set in a horizontal orientation and aligned with, for example, a track in header 108 or the lower longitudinal side of a window panel 118*a*, 118*b* even if floor 104 is uneven or sloped along guide track 106.

Figure 9:
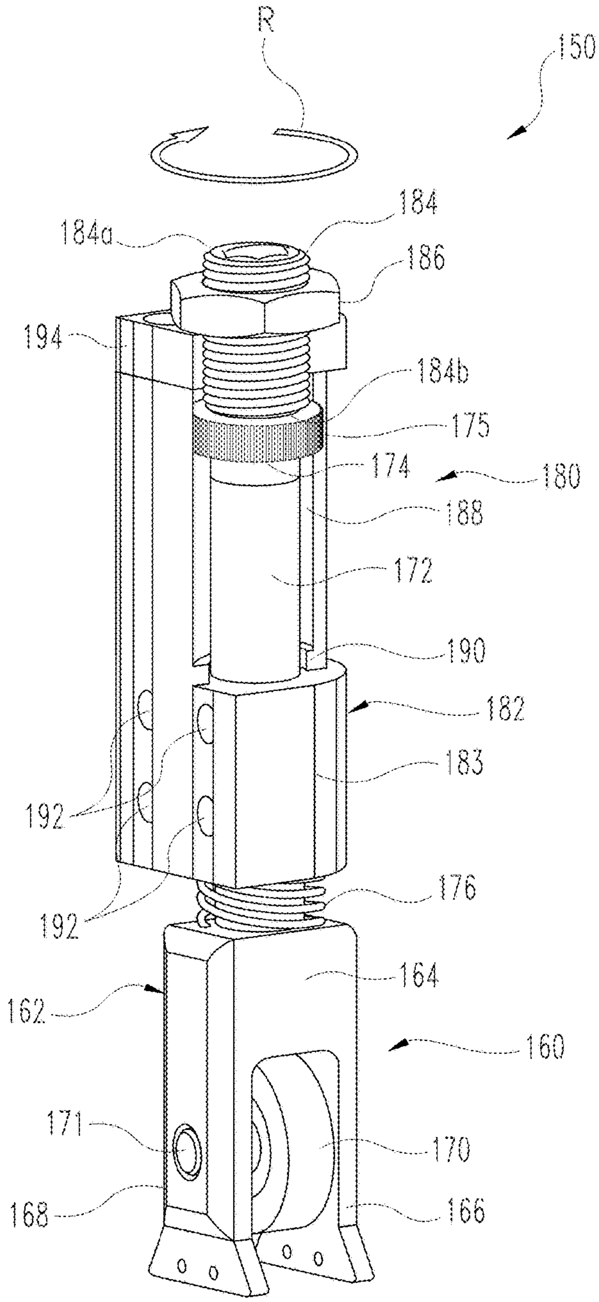
FIG. 9 is a perspective view of the roller guide of FIG. 7 in partial section and in a contracted condition.
Figure 10:
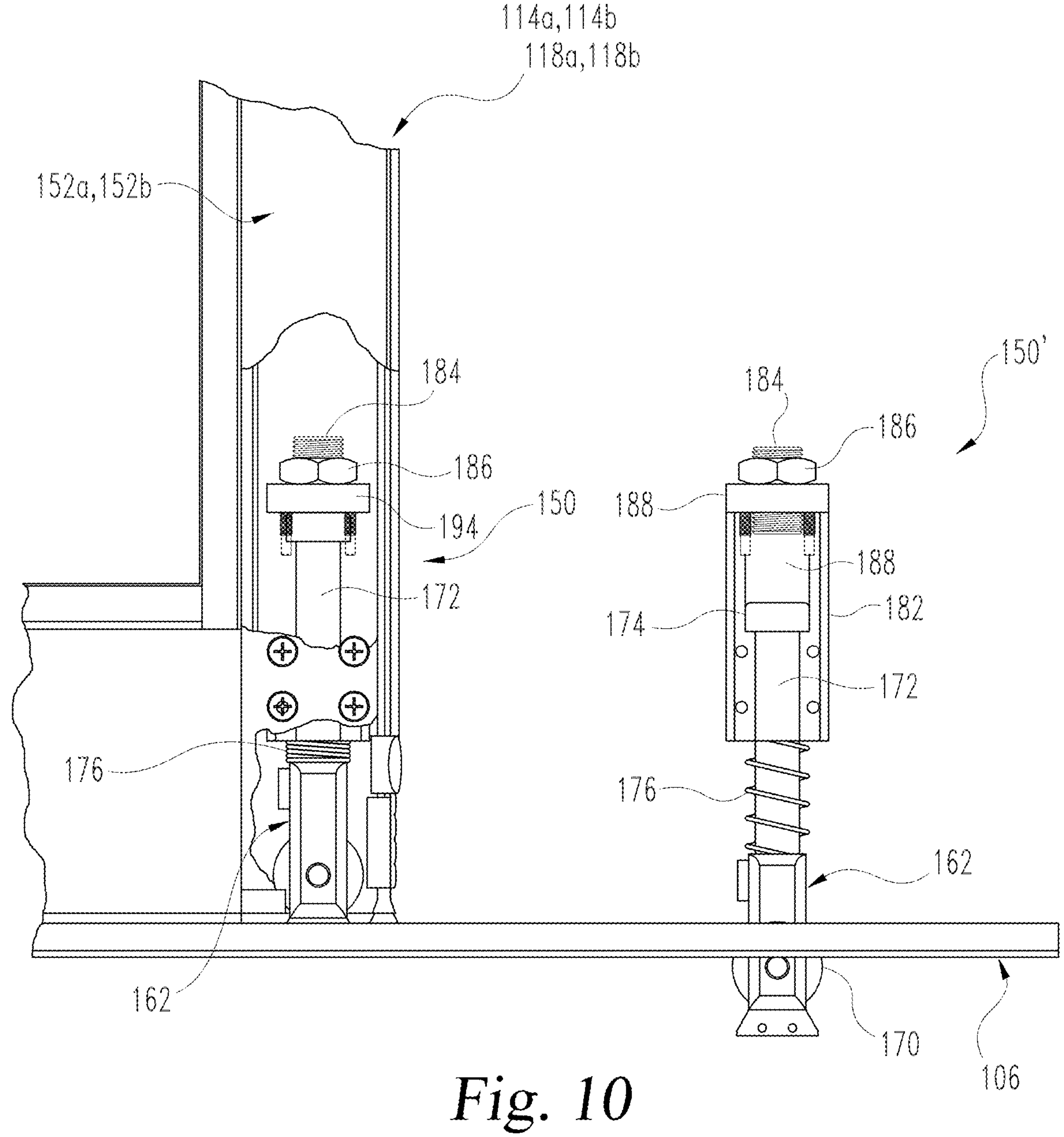
FIG. 10 illustrates a partial elevation view of a sliding door or lower door panel for the sliding door system of FIG. 1 and the roller guide of FIG. 7 removed from the door panel to show a fully extended position and engaged to the door panel to show a contracted, length adjusted condition.
Figure 11:
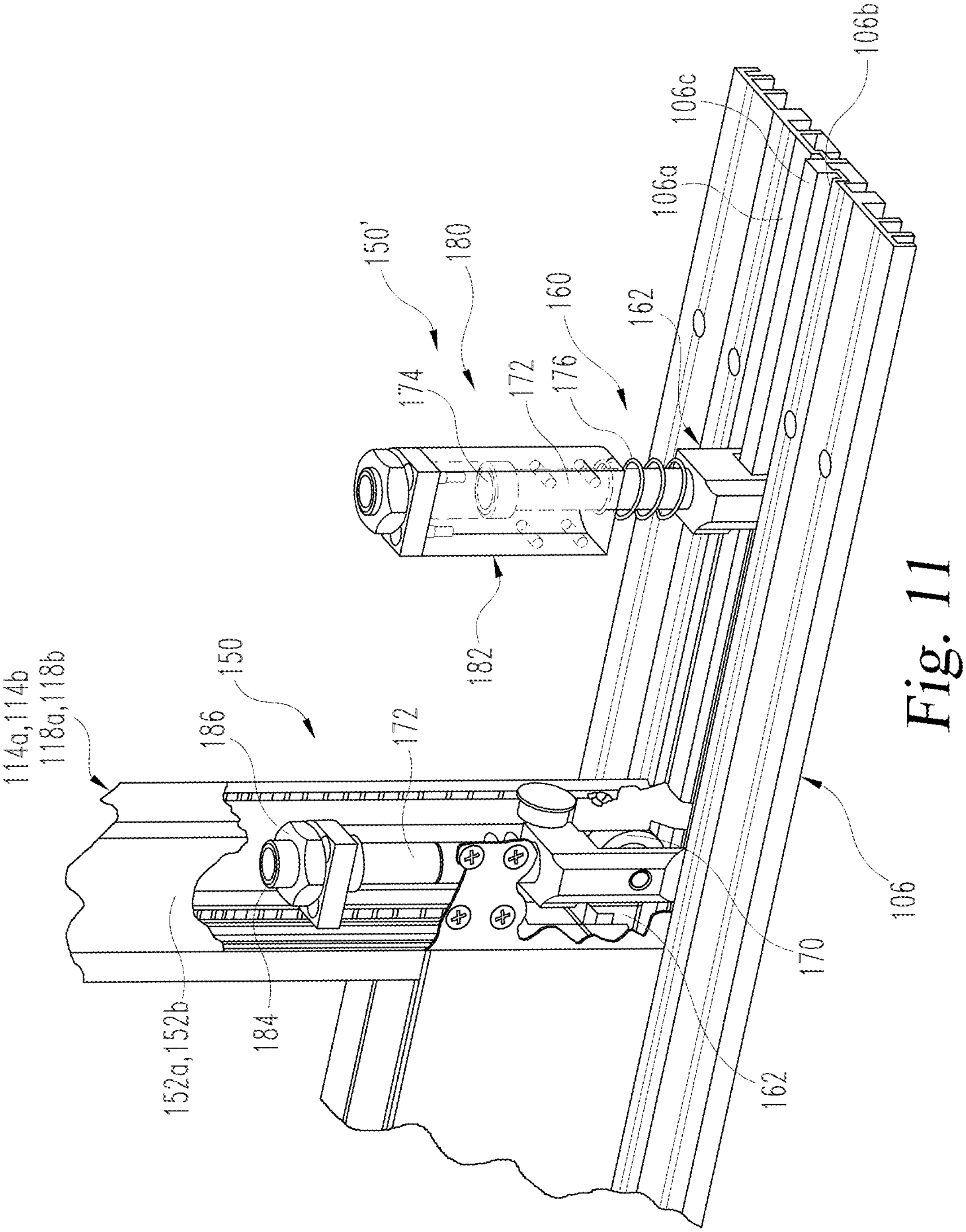
FIG. 11 is a perspective view of the sliding door or lower door panel for the sliding door system of FIG. 10.

Further details of an embodiment of roller guide 150 is provided in FIGS. 7-11. Roller guide 150 includes a roller assembly 160 movably connected to an adjustment assembly 180. Roller assembly 160 includes a roller bracket 162 having a base 164, and first and second legs 166, 168 extending from base 164. Legs 166, 168 are spaced apart to receive a roller 170 therebetween. Roller 170 is rotatably mounted on an axle 171 that extends between and is connected to each leg 166, 168. As shown in FIG. 11, legs 166, 168 are received in corresponding channels 106*a*, 106*b* in the guide track 106, while roller 170 engages a rail 106*c* between channels 106*a*, 106*b* of the guide track 106. Roller 170 facilitates movement of the sliding door 114*a*, 114*b*, or door panel 118*a*, 118*b*, along guide track 106 while legs 166, 168 maintain alignment of the sliding door 114*a*, 114*b* or door panel 118*a*, 118*b* with the guide track 106.

Roller assembly 160 also includes an elongated shaft 172 extending longitudinally from base 164 along longitudinal axis A. Shaft 172 includes a head 174 at the outer end of shaft 172, opposite of base 164. In an embodiment, head 174 of shaft 172 includes a number of axially extending splines 175 that engage an internal surface of guide block 182 along passage 188 to resist rotation of shaft 172 in guide block 182 as shaft 172 is displaced along longitudinal passage 188 of guide block 182. A spring 176, such as a coil spring, resilient sleeve or other biasing element, is provided around shaft 172. Spring 176 is in contact with base 164 of bracket 162 and with adjustment assembly 180.

Figure 8:
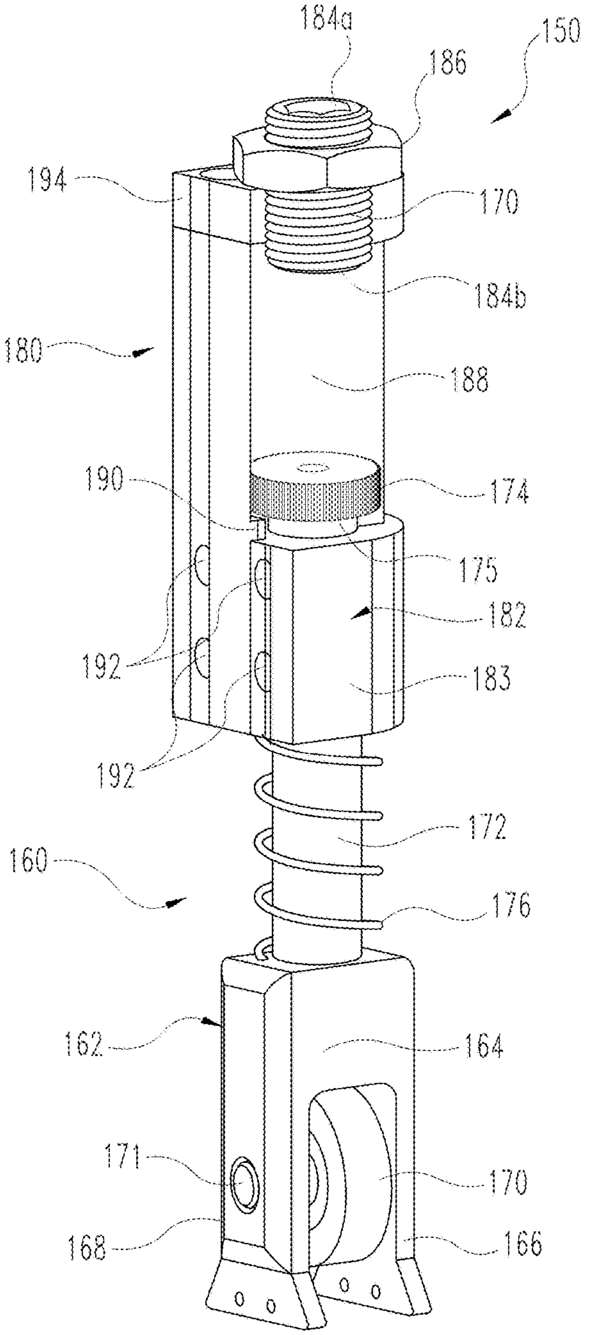
FIG. 8 is a perspective view of the roller guide of FIG. 7 in partial section and in a fully extended condition.

Adjustment assembly 180 includes a guide block 182, an adjuster 184 adjustably engaged to guide block 182, and a lock 186. Guide block 182 includes an elongated body 183 defining a longitudinal passage 188 that receives shaft 172 therein. Shaft 172 is longitudinally movable relative to guide block 182 in passage 188 between a fully extended position, as shown in FIG. 8 for example, and any one of a number of contracted or compressed positions, as shown in FIG. 9 for example.

Guide block 182 includes a lip 190 in passage 188 that contacts the underside of head 174 of shaft 172 in the fully extended position. Guide block 182 also includes a plurality of holes 192 that receive fasteners to couple guide block to a wall of the sliding door 114*a*, 114*b* and/or lower door panel 118*a*, 118*b*. Guide block 182 further includes a cover 194 with a threaded, axially extending, internal bore 197 that provides an adjustable engagement platform for adjuster 184. Cover 194 is secured to the upper end of body 183 of guide block 182 with fasteners 193 extending through axially extending holes 195 of cover 194 and into blind bores 185 in the upper end of body 183 of guide block 182.

In an embodiment, adjuster 184 is an externally threaded set screw extending between an outer end 184*a* and an inner end 184*b* in passage 188 of guide block 182. Adjuster 184 can be threadingly advanced along cover 194 and into guide block 182 with a tool manipulating a tool engaging recess or platform at outer end 184*a* of adjuster 184. Movement of adjuster 184 into passage 188 advances inner end 184*b* toward head 174 of shaft 172.

Lock 186 is engaged to adjuster 184 to lock adjuster 184 in position relative to guide block 182. In an embodiment, lock 186 is a jam nut threadingly engaged around a set screw type adjuster 184. Lock 186 is secured against guide block 182 to secure adjuster 184 in a desired position relative to guide block 182.

The amount of allowable axial displacement of shaft 172 relative guide block 182, and the amount of compression of spring 176 between roller bracket 162 and guide block 182, can be controlled with adjuster 184. The inner end 184*b* of adjuster 184 provides a stop that limits the axial displacement of shaft 172 in guide block 182 and prevents spring 176 from fully compressing to a solid length between bracket 162 and guide block 182.

Accordingly, adjusting the adjuster 184, such as by threading it or rotating it in the clockwise direction, as indicated by arrow R in FIG. 9, through cover 194 into passage 188, increases the height H1 or H2 from floor 104 to longitudinal side 126*a*, 127*a* along the corresponding lateral side 120*a*, 122*a*, as shown in FIG. 6. Conversely, adjusting the adjuster 184, such as by threading it in the counter-clockwise direction through cover 194 out of passage 188, allows greater compression of spring 176 and axial displacement of shaft 172 that decreases the height H1 or H2 from floor 104 to longitudinal side 126*a*, 127*a* along the corresponding lateral side 120*a*, 122*a*.

Spring 176 is mounted on shaft 172 and is operable to apply a bias force between the bracket 162 and guide block 182 in a manner that facilitates vertical adjustment of the sliding door 114*a*, 114*b* and/or lower door panel 118*a*, 118*b* while also maintaining the legs 166, 168 in the guide channels 106*a*, 106*b*.

Before, assembly, as indicated by roller guide 150' in FIGS. 10-11, the roller guide 150 is fully extended and spring 176 is uncompressed between bracket 162 and guide body 182. Adjuster 184 can be manipulated to provide the desired amount of axial movement of shaft 172 into guide block 182 once guide block 182 is coupled to and supporting the weight of the sliding door 114*a*, 114*b* or door panel 118*a*, 118*b*. The amount of axial displacement of shaft 172 into guide block 182 once the sliding door 114*a*, 114*b* or door panel 118*a*, 118*b* is installed on guide track 106 with guide roller 150 thus sets the heights H1 and H2 of the longitudinal side 126*a*, 127*a* at each lateral side 120*a*, 122*a* when installed. The installed positioned in indicated by roller guide 150 in FIGS. 10-11.

The roller guides 150 adjust the height of the upper longitudinal sides 126*a*, 127*a* above floor 104 and/or guide track 106 by limiting compression of spring 176 between bracket 162 and guide block 182. As a result, roller guides 150 can be individually adjusted and mounted to the sliding doors 114*a*, 114*b* so that a parallel orientation can be maintained with the upper guide tracks in header 108 and/or with the lower longitudinal side of the adjacent window panel 116*a*, 116*b*.

Various aspects of the present disclosure are contemplated. According to one aspect, a sliding door system includes a sliding door configured for mounting at a frame defining a doorway opening. The sliding door includes opposite first and second lateral sides extending in a longitudinal direction, opposite first and second longitudinal sides extending in a lateral direction between the opposite first and second lateral sides, a guide track along the first longitudinal side, a first roller guide engaged to the sliding door adjacent the first lateral side and the first longitudinal side, and a second roller guide engaged to the sliding door adjacent the second lateral side and the first longitudinal side. Each of the first and second roller guides includes a roller assembly movably engaged to the guide track and an adjustment assembly movably engaged to the shaft of the roller assembly. The roller assembly includes a bracket, a roller rotatably mounted to the bracket, and a shaft extending from the bracket. The adjustment assembly is configured to set an allowable displacement of the shaft into the adjustment assembly in order to adjust a height of the second longitudinal side of the sliding door above the guide track.

In an embodiment, the adjustment assembly includes a guide block engaged to the sliding door and an adjuster engaged to the guide block. The guide block movably receives an end of the shaft opposite the bracket. The adjuster is configured to advance into and out of the guide block to set the allowable displacement of the shaft into the guide block.

In a further embodiment, the adjustment assembly includes a lock engaged to the adjuster to lock the position of the adjuster relative to the guide block.

In a further embodiment, the adjustment assembly includes a spring connected to the bracket and the guide block. The spring is compressed as the shaft is displaced in the guide block toward the adjuster.

In yet a further embodiment, the spring extends around the shaft, and the adjuster is configured to set the allowable compression of the spring by contacting the shaft in the guide block.

In an embodiment, the first roller guide and the second roller guide are independently adjustable in order to provide different spacing between the guide track and the second longitudinal side of the sliding door at the first and second lateral sides of the sliding door.

In an embodiment, the sliding door includes a door panel along the first longitudinal side and a window panel along the second longitudinal side. The window panel is releasably coupled to the door panel so the sliding door can operate in a door mode when the door panel and the window panel are coupled together and in a window mode when the window panel is uncoupled from the door panel.

In a further embodiment, a weight of the door panel is supported on the guide track by the first and second roller guides, and a weight of the window panel is supported on a header along the frame of the door way.

In an embodiment, the first roller guide is locating within a leading stile at the first lateral side of the sliding door, and the second roller guide is located within a trailing stile at the second lateral side of the sliding door.

According to another aspect of the disclosure, a roller guide for a sliding door is movable along a guide track. The roller guide includes a roller assembly movably engageable to the guide track. The roller assembly includes a bracket, a roller rotatably mounted to the bracket, and a shaft extending from the bracket. The roller guide also includes a guide block including a longitudinal passage. The shaft is movably received in the longitudinal passage. The guide block is configured for engagement to the sliding door. The roller guide also includes a spring around the shaft, and the spring is engaged to the guide block and the bracket. The roller guide further includes an adjuster engaged to the guide block. The adjuster is configured adjust a length of the longitudinal passage available for displacement of the shaft in the longitudinal passage of the guide block in order to adjust a height of the sliding door from the guide track.

In an embodiment, the guide block include a lip in the longitudinal passage, the shaft includes a head that is received in the longitudinal passage, and in a fully extended condition of the roller guide, the head of the shaft contacts the lip in the passage.

In a further embodiment, the spring is compressed between the bracket and the guide block as the shaft moves from the lip toward the adjuster.

In a further embodiment, the head of the shaft includes a number of axially extending splines that engage the guide block to resist rotation of shaft in the guide block as the shaft is displaced along the longitudinal passage of the guide block.

In yet a further embodiment, the adjustment assembly includes a lock engaged to the adjuster to lock the position of the adjuster relative to the guide block.

In yet a further embodiment, the adjuster includes a set screw threadingly engaged to the guide block. The set screw is movable into and out of the longitudinal passage to provide a stop against the head of the shaft to adjust the height of the sliding door from the guide track.

In yet a further embodiment, the lock is a jam nut threadingly engaged to the set screw. The jam nut is advanced along the set screw to contact the guide block to lock the position of the adjuster relative to the guide block.

In an embodiment, the bracket includes a base, the shaft extends from the base, and a pair of spaced apart legs extend from the base opposite the shaft. The roller is rotatably mounted to the pair of legs.

In an embodiment, the shaft contacts the adjuster in the longitudinal passage in a contracted condition of the roller guide.

In an embodiment, the guide block includes a number of holes to received fasteners to couple the guide block to the sliding door.

In an embodiment, the adjuster is movable into and out of the longitudinal passage of the guide block to provide a stop in the longitudinal passage that contacts the shaft to limit displacement of the shaft relative to the guide block to adjust the height of the sliding door from the guide track.

While the invention has been illustrated and described in detail in the drawings and foregoing description, the same is to be considered as illustrative and not restrictive in character, it being understood that only the illustrated embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A sliding door system, comprising:
- a sliding door configured for mounting at a frame defining a doorway opening, the sliding door including:
  - opposite first and second lateral sides extending in a longitudinal direction; and
  - opposite first and second longitudinal sides extending in a lateral direction between the opposite first and second lateral sides;
- a guide track along the first longitudinal side;
- a first roller guide engaged to the sliding door adjacent the first lateral side and the first longitudinal side; and
- a second roller guide engaged to the sliding door adjacent the second lateral side and the first longitudinal side, wherein each of the first and second roller guides includes:
  - a roller assembly movably engaged to the guide track, the roller assembly including a bracket, a roller rotatably mounted to the bracket, and a shaft extending from the bracket; and
  - an adjustment assembly, wherein the shaft of the roller assembly is axially displaceable in the adjustment assembly, wherein the adjustment assembly is axially adjustable to set an allowable axial displacement of the shaft between a fully extended position and any one of a number of contracted positions within the adjustment assembly in order to adjust a height of the second longitudinal side of the sliding door above the guide track, wherein the adjustment assembly includes:
  - a guide block engaged to the sliding door, the guide block including a passage movably receiving an end of the shaft opposite the bracket; and
  - an adjuster engaged to the guide block, the adjuster being configured to advance axially into and out of the passage of the guide block to set an axial length of the passage that is available for allowable displacement of the shaft into the guide block in order to adjust the height of the sliding door from the guide track.

2. The sliding door system of claim 1, wherein the adjustment assembly includes a lock engaged to the adjuster to lock the position of the adjuster relative to the guide block.

3. The sliding door system of claim 1, wherein the adjustment assembly includes a spring connected to the bracket and the guide block, the spring being compressed as the shaft is displaced in the guide block toward the adjuster.

4. The sliding door system of claim 3, wherein the spring extends around the shaft, and the adjuster is configured to set the allowable compression of the spring by contacting the shaft in the guide block.

5. The sliding door system of claim 1, wherein the first roller guide and the second roller guide are independently adjustable in order to provide different spacing between the guide track and the second longitudinal side of the sliding door at the first and second lateral sides of the sliding door.

6. The sliding door system of claim 1, wherein the sliding door includes a door panel along the first longitudinal side and a window panel along the second longitudinal side, the window panel being releasably coupled to the door panel so the sliding door can operate in a door mode when the door panel and the window panel are coupled together and in a window mode when the window panel is uncoupled from the door panel.

7. The sliding door system of claim 6, wherein:

a weight of the door panel is supported on the guide track by the first and second roller guides; and a weight of the window panel is supported on a header along the frame.

8. The sliding door system of claim 1, wherein:

the first roller guide is located within a leading stile at the first lateral side of the sliding door; and the second roller guide is located within a trailing stile at the second lateral side of the sliding door.

9. A sliding door system, comprising:

a sliding door configured for mounting at a frame defining a doorway opening, the sliding door including:

opposite first and second lateral sides extending in a longitudinal direction; and opposite first and second longitudinal sides extending in a lateral direction between the opposite first and second lateral sides;

a guide track along the first longitudinal side;

a first roller guide engaged to the sliding door adjacent the first lateral side and the first longitudinal side; and a second roller guide engaged to the sliding door adjacent the second lateral side and the first longitudinal side, wherein each of the first and second roller guides includes:

a roller assembly movably engaged to the guide track, the roller assembly including a bracket, a roller rotatably mounted to the bracket, and a shaft extending from the bracket; and an adjustment assembly movably engaged to the shaft of the roller assembly, wherein the adjustment assembly is configured to set an allowable displacement of the shaft into the adjustment assembly in order to adjust a height of the second longitudinal side of the sliding door above the guide track; wherein the adjustment assembly further comprises:

a guide block including a longitudinal passage, the shaft of the roller assembly being movably received in the longitudinal passage, the guide block being configured for engagement to the sliding door;

a spring positioned around the shaft and engaged to the guide block and the bracket of the roller assembly; and an adjuster engaged to the guide block, wherein the adjuster is configured to adjust a length of the longitudinal passage available for displacement of the shaft in the longitudinal passage of the guide block in order to adjust the height of the sliding door from the guide track.

10. The roller guide of claim 9, wherein:

the guide block includes a lip in the longitudinal passage;

the shaft includes a head that is received in the longitudinal passage; and in a fully extended condition of the first roller guide or the second roller guide, the head of the shaft contacts the lip in the passage.

11. The roller guide of claim 10, wherein:

the spring is compressed between the bracket and the guide block as the shaft moves from the lip toward the adjuster.

12. The roller guide of claim 10, wherein:

the head of the shaft includes a number of axially extending splines that engage the guide block to resist rotation of shaft in the guide block as the shaft is displaced along the longitudinal passage of the guide block.

13. The roller guide of claim 12, wherein the adjustment assembly includes a lock engaged to the adjuster to lock the position of the adjuster relative to the guide block.

14. The roller guide of claim 13, wherein:

the adjuster includes a set screw threadingly engaged to the guide block, the set screw movable into and out of the longitudinal passage to provide a stop against the head of the shaft to adjust the height of the sliding door from the guide track.

15. The roller guide of claim 14, wherein:

the lock is a jam nut threadingly engaged to the set screw; and the jam nut is advanced along the set screw to contact the guide block to lock the position of the adjuster relative to the guide block.

16. The roller guide of claim 9, wherein:

the bracket includes a base;

the shaft extends from the base;

a pair of legs extend from the base opposite the shaft, the pair of legs being spaced apart from one another; and the roller is rotatably mounted to the pair of legs.

17. The roller guide of claim 9, wherein the shaft contacts the adjuster in the longitudinal passage in a contracted condition of the first roller guide or the second roller guide.

18. The roller guide of claim 9, wherein the guide block includes a number of holes to receive fasteners to couple the guide block to the sliding door.

19. The roller guide of claim 9, wherein:

the adjuster is movable into and out of the longitudinal passage of the guide block to provide a stop in the longitudinal passage that contacts the shaft to limit displacement of the shaft relative to the guide block to adjust the height of the sliding door from the guide track.

* * * * *